United States Patent

Burgdorf et al.

[11] Patent Number: 4,753,312
[45] Date of Patent: Jun. 28, 1988

[54] SLIP-CONTROLLED BRAKE SYSTEM FOR MOTOR VEHICLES WITH FOUR-WHEEL DRIVE

[75] Inventors: Jochen Burgdorf, Offenbach-Rumpenheim; Wolfram Seibert, Pfungstadt, both of Fed. Rep. of Germany

[73] Assignee: Alfred Teves GmbH, Frankfurt am Main, Fed. Rep. of Germany

[21] Appl. No.: 30,146

[22] Filed: Mar. 25, 1987

[30] Foreign Application Priority Data

Apr. 17, 1986 [DE] Fed. Rep. of Germany ....... 3612943

[51] Int. Cl.⁴ .................... B60K 23/08; B60T 8/10
[52] U.S. Cl. .................................. 180/197; 180/244; 303/119
[58] Field of Search .............. 180/244, 248, 197; 303/113, 119

[56] References Cited

U.S. PATENT DOCUMENTS

| | | | |
|---|---|---|---|
| 3,081,836 | 3/1963 | Hill | 180/244 |
| 4,589,511 | 5/1986 | Leiber | 180/244 |
| 4,641,895 | 2/1987 | Belart et al. | 180/244 |

Primary Examiner—John A. Pekar
Attorney, Agent, or Firm—James B. Raden; Robert P. Seitter

[57] ABSTRACT

A slip-controlled brake system for motor vehicles with four-wheel drive, wherein one axle (VA) is driven permanently, and the second (HA) is driven by a differential-slip-sensitive coupling (6). The system comprises sensors (S1 to S4) for determining the rotational behavior of the wheels, electronic switching circuits (38, 39, 40) and an auxiliary-pressure supply system (18). For the traction slip control action, brake pressure is introduced into the wheel brakes (11, 12) of only one axle, preferably the permanently driven axle (VA), and the traction slip of all wheels (VL, VR, HL, HR) is, however, controlled thereby. The electronic switching circuits (40) are preferably provided such that the traction slip control action will only set in when, at least at one wheel of the axle (HA) which is not connected to the traction slip control system, an increased traction slip occurs.

4 Claims, 3 Drawing Sheets

SLIP-CONTROLLED BRAKE SYSTEM FOR MOTOR VEHICLES WITH FOUR-WHEEL DRIVE

BACKGROUND OF THE INVENTION

The present invention relates to a slip-controlled brake system for motor vehicles with four-wheel drive, wherein one axle is driven permanently, and a second axle is driven by a differential-slip-sensitive coupling. Sensors are provided for determining the rotational behavior of the wheels. Electronic switching circuits are provided for the logical processing of sensor signals and for the generation of brake pressure control signals as a function of the rotational behavior of the wheels. An auxiliary-pressure supply system is provided in which, during the traction slip control phase, brake pressure is introduceable into the wheel brakes of the slip-controlled wheels.

Brake systems of this type are known wherein, for the limitation and control of the traction slip, brake pressure from an auxiliary-pressure supply system is introduceable in a dosed manner by way of electromagnetically actuatable multi-directional control valves into the wheel brakes of the wheels having an excessive slip (German published patent application No. 33 27 401). Systems of this type are combined with anti-lock systems or designed as an additional apparatus to anti-lock brake systems. This is done because most of the components, e.g. the wheel sensors, the auxiliary-pressure supply system and some of the electronic switching circuits, are required both for the brake slip and for the traction slip control. Therefore, the additional expenditure required for a combined system is, compared with the expenditure for pure anti-lock or traction slip control system, relatively low.

When designing a traction slip control system for vehicles with four-wheel drive, one would expect that either a connection of all wheel brakes to the traction slip control system or the installation of differential locks were necessary. Both measures would require a high expenditure and would have technical disadvantages. Since, normally, the brake pressure in the rear wheels is controlled in phase according to the select-low principle, and both rear wheel brakes are connected to the same brake circuit, the wheel brakes of both rear wheels would have to be separated hydraulically and electronically in order to achieve an individual traction slip control. Due to, among other things, the rigid coupling of the wheels by way of the drive trains the insertion of differential locks leads to considerable difficulties when determining the vehicle reference speed required for the control action.

It is, therefore, an object of the present invention to develop a traction slip-controlling brake system which is suitable for vehicles with four-wheel drive and a differential-slip-sensitive coupling between the front wheel drive and the rear wheel drive, and which can be manufactured at minimum expenditure.

SUMMARY OF THE INVENTION

This object is achieved in a simple and technically advanced manner in a brake system of the aforementioned type with the improvement wherein, for the traction slip control, brake pressure is introduceable into the brakes of the wheels of only one axle. According to a preferred embodiment of the present invention, only the wheel brakes at the permanently driven axle are (directly) connected to the traction slip control system.

According to another embodiment of the present invention all driven wheels are equipped with sensors for determining the rotational behavior of the wheels. Further, the electronic switching circuits are arranged such that the traction slip control only sets in (i.e., brake pressure for the reduction of the traction slip is only introduced) when at least at one wheel of the axle which is not connected to the traction slip control system an increased traction slip exceeding the optimal value occurs. As a differential-slip-sensitive coupling, a viscosity coupling can be advantageously provided in the drive train leading to the drive axle which can be switched in.

The present invention is thus based on the knowledge that in vehicles having four-wheel drive and a differential-slip-sensitive coupling in the drive train leading to the axle which can be switched in, the traction slip can be controlled at all wheels by way of the wheel brakes of only one axle. This applies also to road surfaces and/or situations where the friction coefficients significantly differ on the right-hand and left-hand side of the vehicle. The disadvantage wherein the total driving torque maximally transmissible per axle depends on that wheel which has the poorer road surface contact, which disadvantage is that hill-climbing from a dead stop is hardly possible on a one-sided icy road surface. is thus eliminated. In this situation the transmissible driving torque is increased due to the introduction of brake pressure on the icy surface side and due to the effect of the lock differential resulting therefrom. The total slip at the second axle connected by way of the differential-slip- sensitive coupling is also determined thereby. The traction slip at the uncontrolled wheel, which is also on an icy road surface, is thus limited automatically. That is, by the control of the first axle.

The maximum wheel slip difference is determined by the speed difference between the drive shaft and the output shaft of the coupling interconnecting both axles. By means of the brake system according to the present invention, it is, therefore, possible to control and/or limit the traction slip of all driven wheels by connecting only one axle to the traction slip control system. Accordingly a sufficient transmission of tractive and cornering forces is ensured at all wheels in any situation.

BRIEF DESCRIPTION OF THE DRAWING

Further features, advantages and applications of the present invention will become apparent from the following description of an embodiment taken in connection with the accompanying drawing wherein:

FIG. 1 illustrates the drive trains of a vehicle with four-wheel drive having a drive axle which is driven permanently one one which can be switched in;

DETAILED DESCRIPTION

Figure 1:
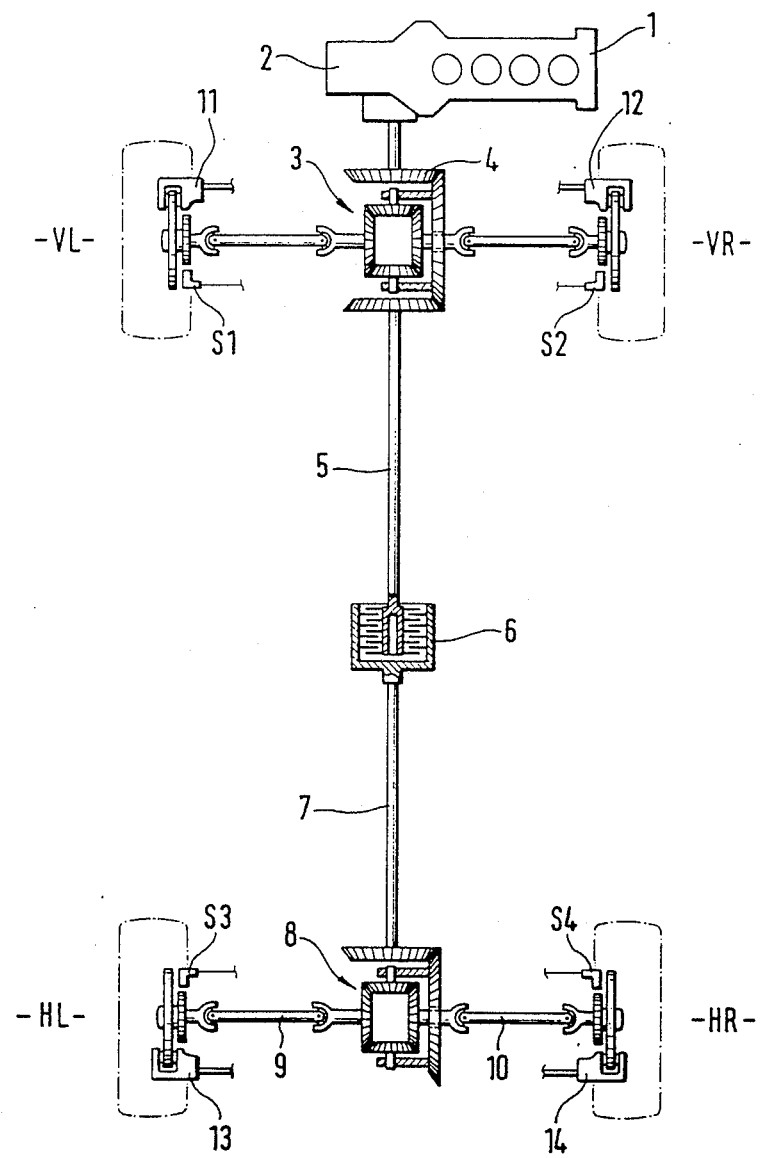

FIG. 1 illustrates a vehicle with four-wheel drive, wherein both front wheels VL, VR are permanently driven by means of an engine 1 by way of a transmission 2 and by way of a differential 3. The transmission 2 is, in addition, engaged by way of a toothed wheel 4 with a drive shaft 5 driving a shaft 7 by way of a differential-slip-sensitive coupling which in this case is a viscosity coupling 6. This shaft 7 communicates by way of a rear-axle differential 8 and the drive halfshafts 9, 10 with the rear wheels HL, HR.

All vehicle wheels are equipped with sensors S1 to S4 transmitting the information relating to the rotational behavior of the individual wheels. This information is required for the brake slip and traction slip control and is in the form of alternating signals, whose frequencies are proportional to the angular velocity of the individual wheels. These signals are applied to the electronic control unit illustrated in FIG. 3 and described hereinafter with reference to FIG. 3.

In the illustrated embodiment, only the wheel brakes 11 and 12 of the front wheels VL, VR, i.e., the wheel brakes at the permanently driven front axle VA, are used for traction slip control. The amount of the driving torque transmitted by way of the coupling 6 onto the rear axle HA depends on the slip difference between the front and the rear wheels. During normal operation, (i.e., as long as the traction slip at the front wheels VL, VR is relatively low) the rear axle contribution to the drive is unimportant. If, however, a high traction slip occurs at the front wheels, the coupling effect of the coupling 6 sets in and switches the rear axle drive in.

Figure 2:
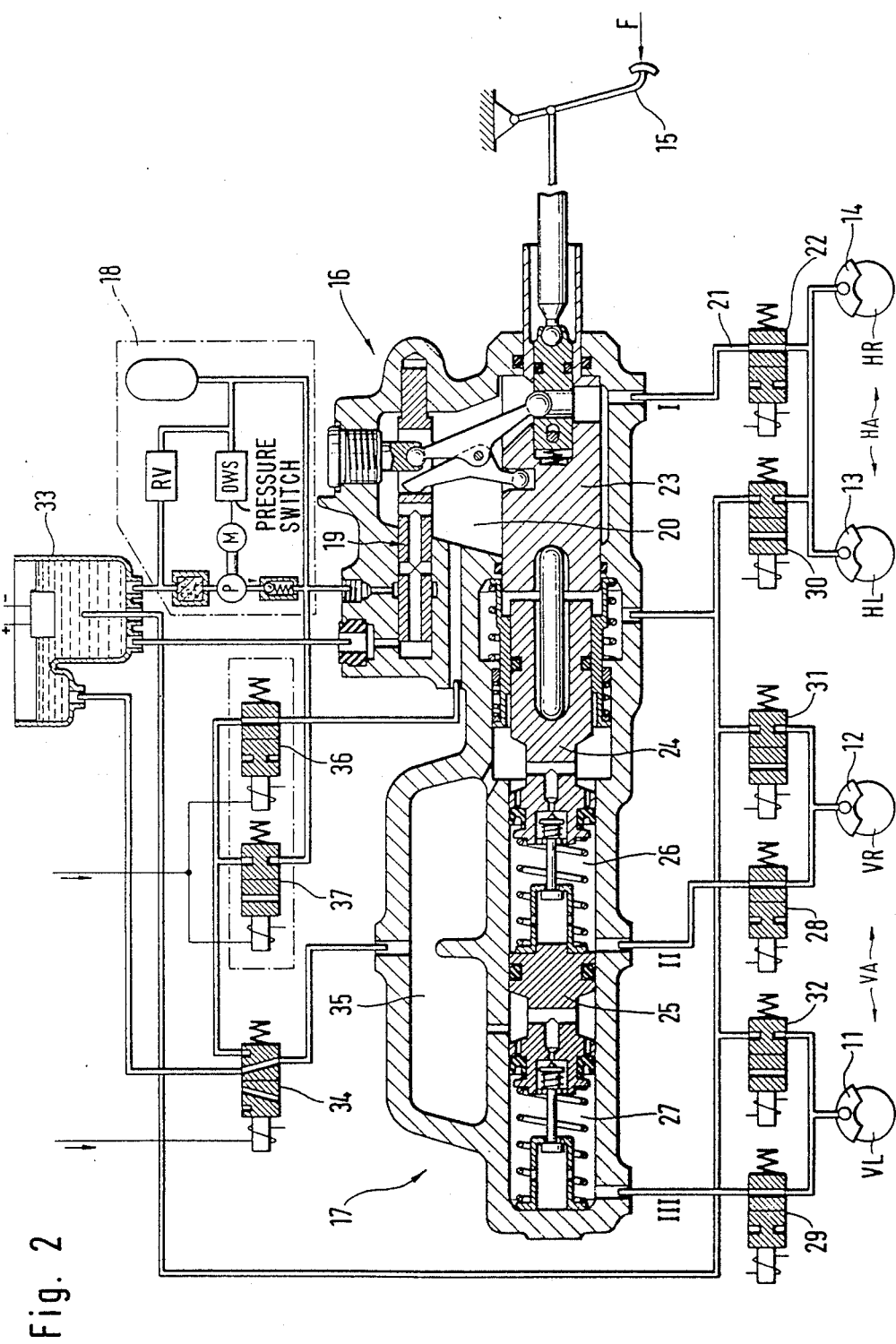
FIG. 2 depicts the design and the hydraulic circuitry of a brake system in accordance with the present invention for controlling the brake slip and the traction slip; and, FIG. 3 illustrates the control principle of the brake system according to FIG. 2 in the form of a block diagram.
Figure 3:
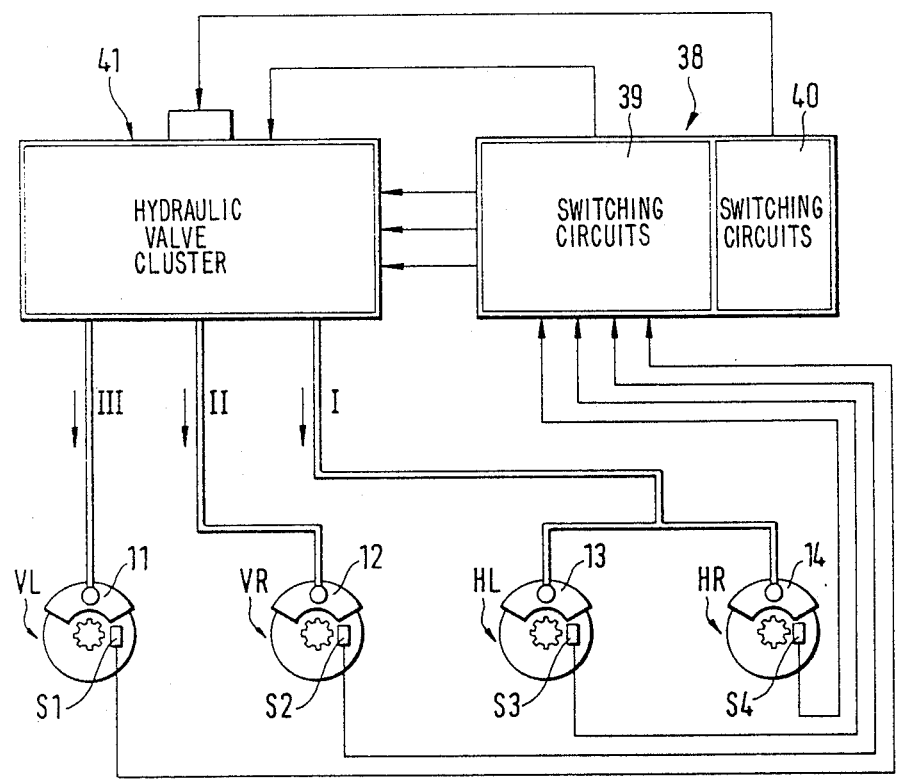

FIG. 2 shows an embodiment of a three-circuit hydraulic brake system which, in conjunction with the circuitry depicted in FIG. 3, controls both the brake slip and the traction slip. In this case, this is a pedal-actuated (brake pedal 15) hydraulic assembly comprising a hydraulic brake power booster 16 and a tandem master cylinder 17 and an auxiliary-pressure supply system 18 and a plurality of multi-directional control valves. Auxiliary-pressure supply system includes a conventional pressure control switch DWS and a conventional relief valve RV. The brake pressure generator 16 and the master cylinder 17 are structurally combined.

When the brake pedal 15 is actuated, pressure from the auxiliary-pressure supply system 18 is introduced into a booster chamber 20 by way of a control valve comprising a slider valve 19 arranged inside the brake power booster 16. In the chamber 20, this pressure is approximatively proportional to the pedal force F. Normally (i.e., during uncontrolled braking) the booster pressure is also available at the hydraulically paralleled rear wheel brakes 13, 14 by way of a hydraulic conduit 21 and an S0-valve (open without current) 22.

In addition, the pressure in the booster chamber 20 is transmitted by way of a booster piston 23 onto the pistons 24 and 25 inside the tandem master cylinder 17 so that, on actuation of the brake pedal 15, brake pressure is generated in the working chambers 26, 27 of the master cylinder 17 and thus, by way of the S0-valves 28, 29, also in the front wheel brakes 12, 11.

In each brake circuit I, II, III, there is further provided and SG-valve (closed when no current is applied) 30, 31 and/or 32, through the intermediary of which a pressure fluid return flow to a pressure compensating and pressure fluid storage reservoir 33 is possible during the pressure reduction phase. Finally, the brake system also comprises a so-called main valve 34 (i.e., a three way/two-position valve) which normally connects a pre-chamber 35 of the master cylinder 17 with the pressure compensating reservoir 33. After switching over to the second switching position, pressure fluid from the booster chamber 20 is fed by means of the main valve 34, by way of the cups at the periphery of the master cylinder pistons 24, 25, into the working chambers 26, 27 and thus into the static brake circuits. That is, into the master cylinder brake circuits II, III.

The components described so far are required for normal braking operations and for the brake slip control For the traction slip control, another valve pair comprising a S0-valve 36 and an SG-valve 37, is provided. By way of this valve pair and by way of the main valve 34, brake pressure can be introduced from the auxiliary-pressure supply system 18 by way of the pre-chamber 35 into the working chambers 26, 27 and from there into the wheel brakes 11, 12 even without actuating the brake pedal 15. A communication with the pressure compensating reservoir 33 is again establishable by way of the SG-valves 28, 29 and the brake pressure is thus reducable.

Except for the main valve 34, all S0-and SG-valves described herein are provided in the form of electromagnetically actuatable two-way/two-position multi-directional control valves. A combination of the S0-/SG-valve pairs 22, 30; 28, 31; 29, 32 and 36, 37 such as three-way/three-position valves is, of course, also possible.

By means of the brake system described in FIG. 2, together with the multi-directional control valves, the brake pressure in the front wheels can thus be controlled individually during the brake slip control action. The rear wheel brakes 13, 14, on the other hand are paralleled so that the brake pressure prevailing in both brakes is always the same.

For the traction slip control, brake pressure is only applied onto the front wheel brakes 11, 12. The outlet signals of the sensors S1, S2, S3 and S4 representing the rotational behavior of the wheels are fed into an electronic control unit 38 comprising both switching circuits 39 for the brake slip control and switching circuits 40 for the traction slip and/or starting slip control. These switching circuits can be provided in the form of wired circuitry or of program-controlled switching circuits, such as micro-computers, as is well known in the art.

The hydraulic assemblies and the valves described by means of FIG. 2 are symbolically combined in a cluster 41 connected to which are the rear wheel brakes 13, 14 by way of three hydraulically isolated circuits and/or brake circuits I, II, III. The rear brakes can be controlled jointly, and the front wheel brakes 11, 12 can be controlled individually.

By reference, FIG. 2, taken in conjunction with FIG. 3, it can be seen that, for the traction slip control of the vehicle with four-wheel drive according to FIG. 1, only a slight additional expenditure is necessary as against a pure anti-lock system. The traction slip is, nevertheless, limited at all four wheels in any conceivable situation, even though only the front wheels are (directly) connected to the traction slip control system. In this regard, and by contrast thereto, a connection of all driven wheels to the traction slip control system, which would result in a substantial additional expenditure, would not lead to a significant improvement of the starting and accelerating behavior or of the directional stability.

What is claimed is:

1. A slip-controlled brake system for motor vehicles with four-wheel drive, wherein one axle is driven permanently, and a second axle is driven by way of a differential-slip-sensitive coupling, a plurality of sensors for determining the rotational behavior of the wheels, electronic switching circuits coupled to said sensors for the logical processing of sensor signals and for the generation of brake pressure control signals as a function of the rotational behavior of the wheels, an auxiliary-pressure supply system in which during the traction slip control phase, brake pressure is introduceable into the wheel brakes of the slip-controlled wheels, at least one electromagnetically actuable normally closed valve connected between said auxiliary-pressure supply system and at least one wheel brake of the wheel brakes of a selected one of said axles and means responsive to said brake pressure control signals for actuating said valve to provide the traction slip control wherein brake pressure is introduceable into the wheel brakes (11, 12) of the wheels (VL, VR) of only said selected one of said axles.

2. The brake system according to claim 1, wherein brake pressure is introduceable only into the wheel brakes (11, 12) at the permanently driven axle (VA) during traction slip control.

3. The brake system according to claim 1, wherein the driven wheels, (VR, VL, HR, HL) are equipped with sensors (S1, S2, S3, S4) for determining the rotational behavior of the wheels, and wherein the electronic switching circuits (40) provide that the traction slip control only commences when an increased traction slip is detected at least at one wheel of the axle (HA) which is not connected to the traction slip control system.

4. The brake system according to claim 1, wherein as a differential slip-sensitive coupling (6), a viscosity coupling is provided in the drive train leading to the axle (HA) which is not driven permanently.

* * * * *